(No Model.)
A. W. LACY.
CARBURETOR.
No. 268,910. Patented Dec. 12, 1882.
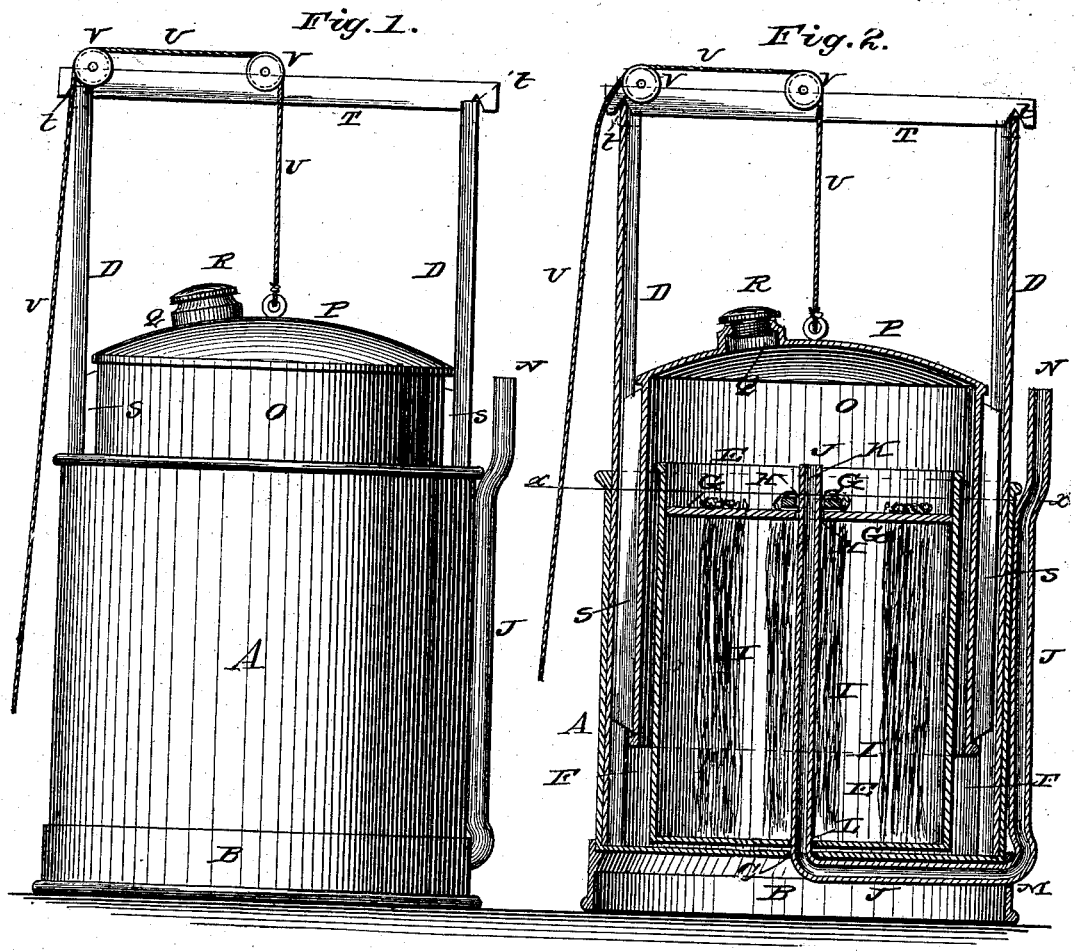
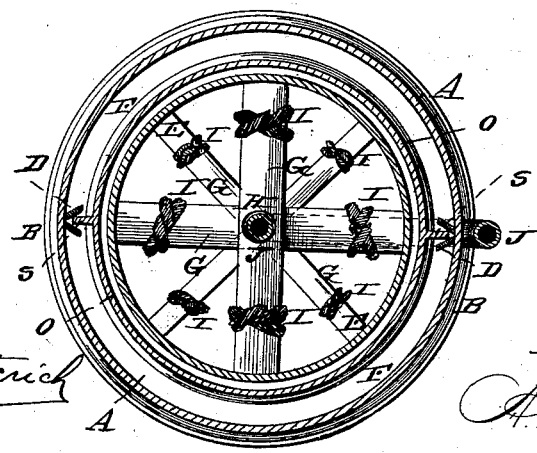
Witnesses:
Phil C. Dieterich
J. R. Littell
Inventor.
A. W. Lacy,
by C. A. Snow & Co.
Attorneys.

UNITED STATES PATENT OFFICE.

AUGUSTUS W. LACY, OF ATTLEBOROUGH, MASSACHUSETTS.

CARBURETOR.

SPECIFICATION forming part of Letters Patent No. 268,910, dated December 12, 1882.

Application filed July 21, 1882. (No model.)

*To all whom it may concern:*

Be it known that I, AUGUSTUS W. LACY, of Attleborough, in the county of Bristol and State of Massachusetts, have invented certain new and useful Improvements in Carburetors; and I do hereby declare that the following is a full, clear, and exact description of the invention, which will enable others skilled in the art to which it appertains to make and use the same, reference being had to the accompanying drawings, which form a part of this specification.

This invention relates to carburetors and the like; and it consists in certain improvements in the construction and operation of the same, whereby the device may be used either as a carburetor or for forcing air into a carburetor.

It has for its object to provide a simple, inexpensive, and efficient means for producing illuminating-gas.

In the drawings, Figure 1 is a side view of the device; Fig. 2, a vertical sectional view thereof; Fig. 3, a horizontal sectional view on the line $x\,x$, Fig. 2.

Referring to the drawings, A designates an outer cylindrical tank or casing, which is supported on an annular supporting ring or flange, B, at its bottom, an opening, C, being centrally located in the latter. Inside tank A, and extending some distance above the same, are arranged opposite vertical guides D D, preferably V-shaped in cross-section.

E is a permanent correspondingly-shaped tank arranged inside tank A, and elevated above the bottom thereof, a space, F, being also left between the walls of the two tanks. At the top of tank E, and inside the same, are arranged transverse radial cross-strips G, each having an opening, H, in its center. From strips G depend wicks I to assist in evaporation, the arrangement being such that the wicks depend all around the tank.

J is a tube or pipe having its inner open end, K, braced and secured in openings H of strips G, and from thence extending downwardly through openings C of tank A and L in the bottom of tank E. From opening C the pipe extends horizontally across under the bottom of tank A and out through an opening, M, in supporting-flange B, from whence it extends up alongside tank A, its open end N being adapted to receive a conducting tube or pipe. The pipe J is thus securely braced and held in position.

O is an inverted tank, having a top, P, and an open bottom, an opening, Q, adapted to be closed by a screw-cap, R, being provided in the top P. The walls of tank O are provided with opposite vertical ribs S S, which enter the V-shaped guides D D, so that the tank can work up and down in the space F between tanks A and E.

On guides D D is removably fixed a cross-piece, T, preferably having inverted-V notches $t$ at its ends, which fit over the upper edges of the guides. Therefore by removing strip T the tank O may be withdrawn. To provide for elevating the latter a rope or cord, U, is connected to its top and passed up and over pulleys V V on strip T, from whence it passes down to a windlass or any other suitable device arranged on the outside of tank A.

The operation and advantages of my invention will be readily understood. To produce illuminating-gas by the volatilization of a liquid, tank A is first filled with water. Tank E is then filled, through opening Q of tank O, with "gasoline" or any suitable volatile oil. The tank O is raised and fills with air through its opening Q, when the latter is closed by its cap R. Then when the tank O descends the air is forced over the volatile oil and escapes out through pipe J in a gaseous form. To force air into a carburetor the volatile oil is omitted from tank E, when by the same process pure air will be forced through pipe J, the latter being connected with the carburetor.

I claim and desire to secure by Letters Patent—

As an improvement in carburetors, the combination of outer tank, A, having openings C, inside tank, E, having opening L, and provided at its top with radial transverse strips G, having central openings, H, and carrying depending wicks I, arranged around the interior of tank E, inverted tank O, having elevating means, and escape-pipe J, extending from the top of tank E down through openings H L C to the outside, as set forth.

In testimony that I claim the foregoing as my own I have hereto affixed my signature in presence of two witnesses.

AUGUSTUS WILSON LACY.

Witnesses:
JOHN C. WILMARTH,
LYMAN W. DEAN.